(12) United States Patent
Moore et al.

(10) Patent No.: US 9,662,823 B2
(45) Date of Patent: May 30, 2017

(54) COATED STEEL SUCKER RODS AND PROCESS FOR MANUFACTURE OF SAME

(75) Inventors: Russel Moore, New Sarepta (CA); Jordan Moore, New Sarepta (CA)

(73) Assignee: Lifting Solutions Energy Services, Inc., Edmonton, Alberta (CA)

( * ) Notice: Subject to any disclaimer, the term of this patent is extended or adjusted under 35 U.S.C. 154(b) by 270 days.

(21) Appl. No.: 13/985,867

(22) PCT Filed: Feb. 16, 2012

(86) PCT No.: PCT/CA2012/000142
§ 371 (c)(1),
(2), (4) Date: Aug. 15, 2013

(87) PCT Pub. No.: WO2012/109736
PCT Pub. Date: Aug. 23, 2012

(65) Prior Publication Data
US 2013/0316173 A1    Nov. 28, 2013

Related U.S. Application Data

(60) Provisional application No. 61/443,352, filed on Feb. 16, 2011.

(51) Int. Cl.
*B29C 47/02* (2006.01)
*B05D 5/08* (2006.01)
(Continued)

(52) U.S. Cl.
CPC .............. *B29C 47/025* (2013.01); *B05D 5/08* (2013.01); *B05D 7/146* (2013.01);
(Continued)

(58) Field of Classification Search
USPC ........................................ 428/379; 427/398.1
See application file for complete search history.

(56) References Cited

U.S. PATENT DOCUMENTS 3,815,640 A * 6/1974 Iida .................... A01G 9/122
138/146
4,905,760 A * 3/1990 Gray ............................ 166/68
(Continued)

FOREIGN PATENT DOCUMENTS

CA           2291393 A1    6/2001

*Primary Examiner* — Lynda Salvatore
(74) *Attorney, Agent, or Firm* — Dentons US LLP

(57) ABSTRACT

In a process for applying a friction-resistant coating to a steel sucker rod, the rod is passed, in sequence, through a surface preparation stage (for example, scale removal, shot peening, or other suitable method), an adhesive application stage (to enhance the strength of the coating's bond to the rod), an extrusion stage (in which the rod is passed through a die in conjunction with a flow of melted polymeric coating material), and a cooling (coating solidification) stage. Typically, the radial thickness of the coating will be between 0.125 and 0.375 inches. The process is adaptable to apply extruded coatings to continuous rod or to individual sucker rods having upset ends. The coating may be selected from but is not limited to high-density polyethylene, cross-linked polyethylene, polyvinylidene fluoride, ethylene tetrafluoroethylene, polytetrafluoroethylene, polyphenylensulfide, nylon, polyester, polyethersulfone, polyethylene terephthalate, polypropylene, polystyrene, epoxy, or acetyl.

22 Claims, 3 Drawing Sheets

(51) Int. Cl.
*B05D 7/14* (2006.01)
*E21B 17/10* (2006.01)
B05D 3/04 (2006.01)
B05D 1/26 (2006.01)

(52) U.S. Cl.
CPC .......... *E21B 17/1071* (2013.01); *B05D 1/265* (2013.01); *B05D 3/0426* (2013.01); *B05D 2504/00* (2013.01); *Y10T 428/294* (2015.01)

(56) References Cited

U.S. PATENT DOCUMENTS 5,439,711 A * 8/1995 Vu et al. .................... 427/430.1
6,174,569 B1 * 1/2001 Blomer .................. B05D 7/148
　　　　　　　　　　　　　　　　　　　　138/146

* cited by examiner

COATED STEEL SUCKER RODS AND PROCESS FOR MANUFACTURE OF SAME

FIELD OF THE DISCLOSURE

The present disclosure relates in general to sucker rods for use in conjunction with pump jacks on producing oil and gas wells, and in particular to processes for reducing friction between sucker rods and production tubing and resultant abrasion and wear.

BACKGROUND OF THE DISCLOSURE

In common methods for producing oil from a well drilled into an oil-bearing subsurface formation, a string of steel production tubing is positioned in the well bore and extending from the subsurface production zone up to a pump jack in accordance with well-known methods, and as schematically illustrated in FIG. 1 herein. A downhole pump is disposed within the production tubing in the production zone to raise well fluids (e.g., oil, gas, formation water) to the surface, by reciprocating vertical movement of a travelling valve incorporated into the pump. The travelling valve is reciprocated by a typically steel "sucker rod" extending upward within the production tubing to the well where it connects to a polished rod (alternatively referred to as a "polish rod") extending upward through a wellhead tee and stuffing box to connect to the "horse head" at the free end of the "walking beam" of the pump jack. By means of a suitable motor and associated mechanical linkage, the pump jack is operable to rock the walking beam such that the horse head reciprocates up and down, thereby alternately raising and lowering the sucker rod and the travelling valve, causing well fluids to be drawn into the well and the production tubing, and to be moved upward within the production tubing toward the wellhead, on each upward stroke of the travelling valve.

As the sucker rod reciprocates up and down within the production tubing, it inevitably comes into contact with the inner wall of the tubing. The resultant friction between the steel sucker rod and the tubing causes wear on both the rod and the tubing. In addition, this friction increases the magnitude of the force that needs to be provided by the pump jack to raise the sucker rod (and the travelling valve) on each upward stroke.

As an alternative to a pump jack as described above, well fluids may also be produced using a wellhead apparatus that rotates the sucker rod to drive a downhole screw pump (also known as a positive displacement pump), rather than reciprocating the sucker rod up and down. Although rotating sucker rods thus function in a different fashion than reciprocating sucker rods, they are nonetheless prone to friction-induced wear due to contact with the tubing.

Sucker rods are typically round or semi-elliptical in cross-section, and typically hot-rolled from carbon or alloy steel, with diameters ranging from ⅝ to 1⅛ inches. Sucker rods are commonly made up as a string of individual rods (typically 25 to 30 feet in length) threaded together using internally-threaded tubular couplers. The ends of a threaded sucker rod are typically upset (i.e., larger in diameter than the main length of the rod), and are threaded for mating engagement with couplers. The upset portion at each end of a threaded sucker rod is typically about 5 inches long, and includes a tool-engagement section to facilitate use of a wrench to tighten a coupler onto the rod. However, it is also known to use continuous sucker rod, such as COROD® continuous sucker rod available from Weatherford International Ltd.

It is known to mitigate the undesirable consequences of friction between sucker rods and production tubing by lining the tubing (i.e., coating the inner surfaces of the tubing) with a low-friction material such as HDPE (high-density polyethylene). Although lined tubing reduces friction, the steel sucker rods are still prone to deterioration due to friction-induced wear notwithstanding the lining, and friction loads still will be imposed on the pump jack. For these reasons, there is a need in the oil and gas industry for means for further reducing friction between sucker rods and the production tubing in which they reciprocate.

BRIEF SUMMARY

In one aspect, the present disclosure teaches processes for coating or encasing either continuous or individual steel rods with a friction-resistant material (alternatively referred to herein as a low-friction or friction-reducing material, and meaning a material having a comparatively low coefficient of friction such that that the frictional resistance of an object or surface to which the material is applied will be reduced). In a further aspect, the disclosure relates to continuous or individual steel rods that have been coated or encased with a friction-resistant material. When steel rods coated in accordance with the present teachings are used as sucker rods reciprocating or rotating within the production tubing of an oil well, friction-induced forces and wear arising from contact between the sucker rods and the tubing are significantly reduced. This is most particularly the case when the tubing is lined or coated with a friction-resistant material as well, due to the very low coefficient of friction between the friction-resistant material coating the sucker rods and the friction-resistant material lining the tubing.

In preferred embodiments, the friction-resistant coating material is a polymeric material comprising either a thermoplastic material or a thermoset material or both. The coating can be formed of co-polymers, homo-polymers, composite polymers, or co-extruded composite polymers. The term "co-polymers" refers to materials formed by mixing two or more polymers, "homo-polymers" refers to materials formed from a single polymer, and "composite polymers" refers to materials formed of two or more discrete polymer layers that can either be permanently bonded or fused.

The polymeric materials used to coat steel rods in accordance with the present disclosure may comprise any one or more of various polymers. In particularly preferred embodiment, the friction-resistant coating material is high-density polyethylene (HDPE) or cross-linked polyethylene (PEX). Polyethylene in general has several advantages over other materials such as polyurethane. For example, polyethylene has a lower coefficient of friction than polyurethane, it is easier to manufacture (e.g., it does not require catalysts or curing agents, and does not require time to cure), it is easier to recycle than thermoplastic polyurethane, and it is less costly.

However, the present disclosure is not restricted to the use of polyethylene or any other particular coating material. Other polymeric coating materials that may be used in accordance with the present teachings include but are not limited to polyvinylidene fluoride (PVDF), ethylene tetrafluoroethylene (ETFE), polytetrafluoroethylene (PTFE, or "Teflon"®), polyphenylensulfide (PPS, or "Fortron"®), polyamide (nylon), polyester, polyethersulfone, polyethylene terephthalate (PET), polypropylene, polystyrene, epoxy, and acetyl.

The coating material preferably but not necessarily will have an axial modulus of elasticity exceeding 100,000 psi, low thermal conductivity, elasticity (i.e., elongation before rupture) of at least 500%, extreme high chemical resistance, within an operating temperature range from as low as −75° C. to as high as +220° C., as required or desired to suit particular operational conditions.

BRIEF DESCRIPTION OF THE DRAWINGS

Embodiments in accordance with the present disclosure will now be described with reference to the accompanying Figures, in which numerical references denote like parts, and in which.

DETAILED DESCRIPTION

Figure 1:
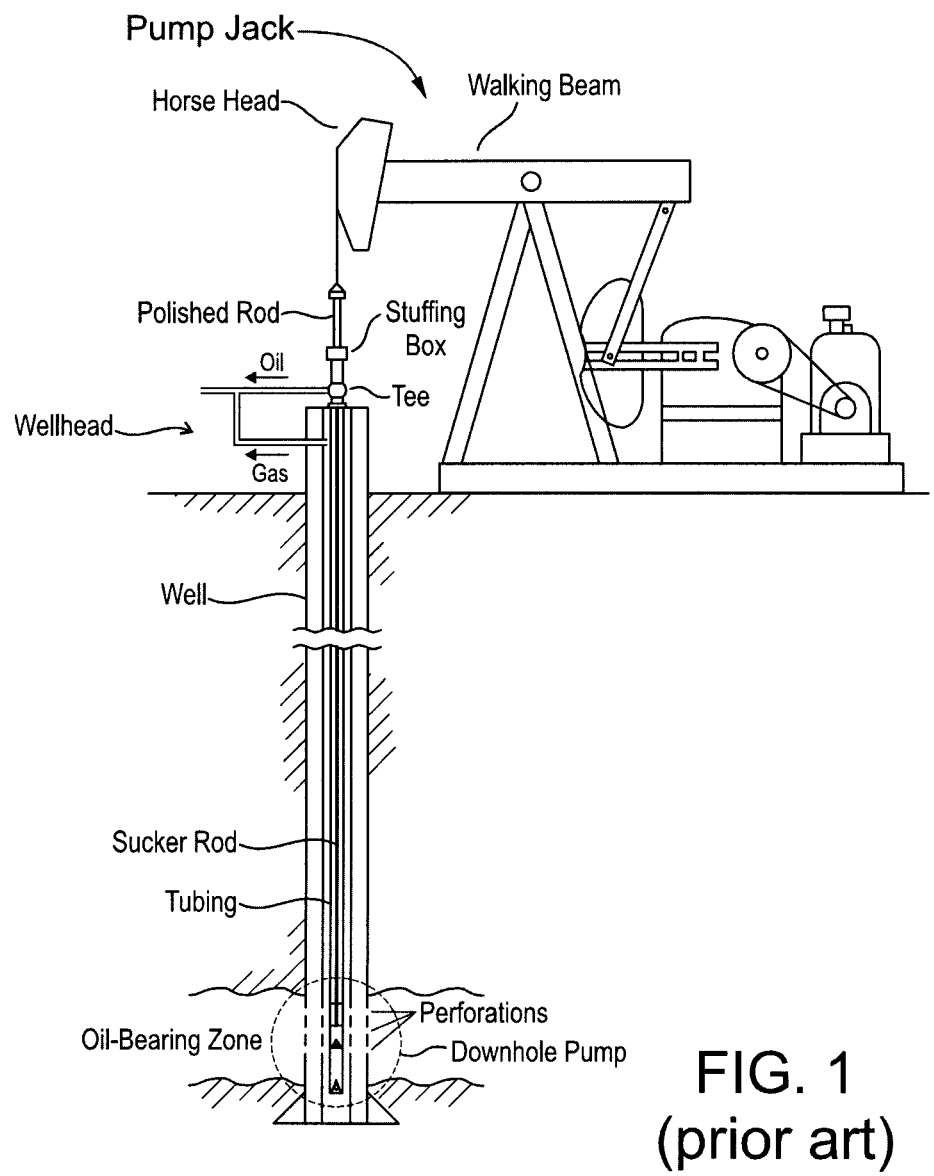
FIG. 1 is schematic illustration of a prior art pump jack reciprocating a sucker rod string to operate a downhole pump to produce hydrocarbon fluids from a subsurface formation.
Figure 2:
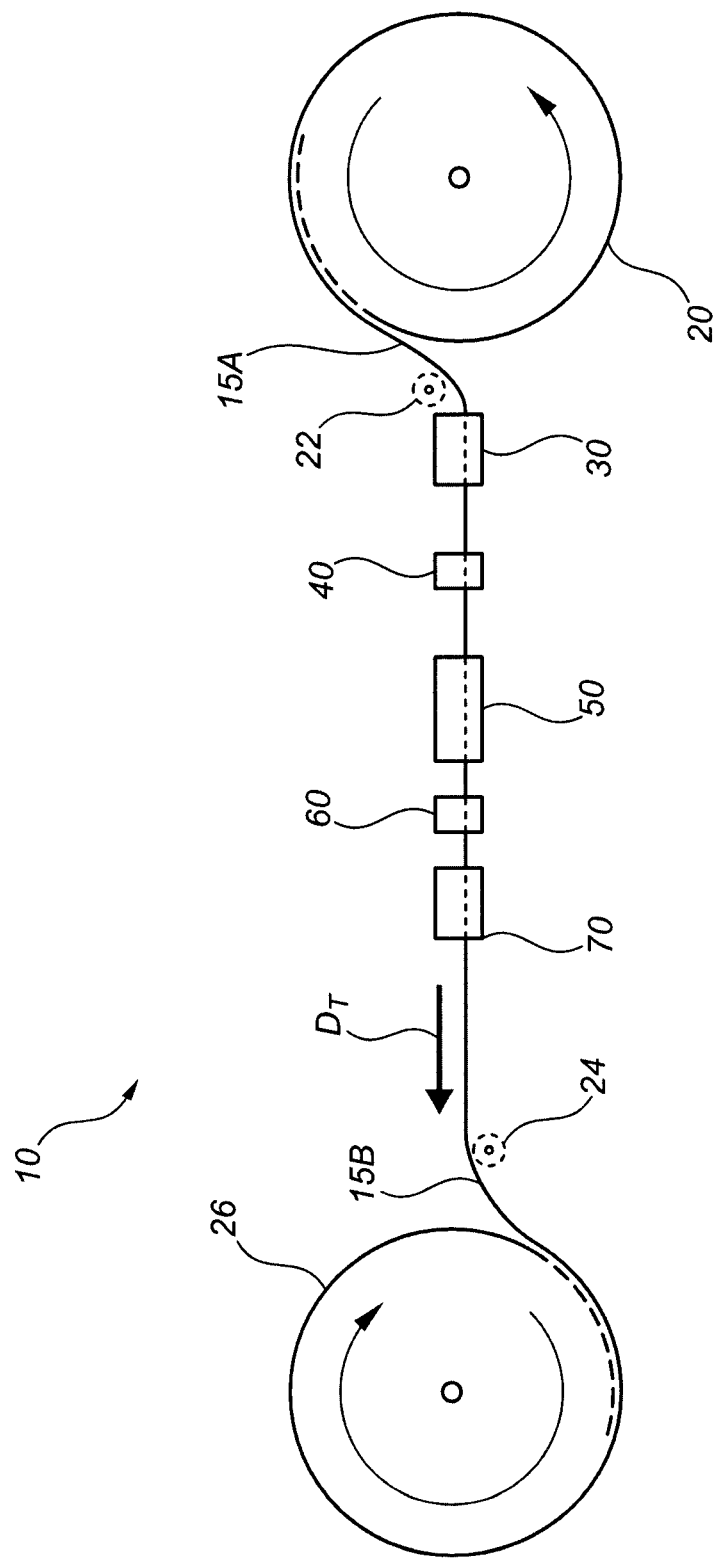
FIG. 2 is a schematic illustration of one embodiment of a process in accordance with the present disclosure for coating a continuous steel rod with a low-friction material.

FIG. 2 schematically illustrates one embodiment of a process for coating continuous steel rod with a friction-resistant (i.e., low-friction) material in accordance with the present disclosure, using a coating apparatus generally indicated by reference number 10. In preferred embodiments, coating apparatus 10 includes, in sequence, a surface preparation stage 30, an adhesive application stage 40, an extrusion stage 50, a cooling stage 60, and a puller stage 70. Uncoated continuous rod 15A is fed from a supply reel 20 into surface preparation stage 30, to prepare the surface of the rod for enhanced bondability to the selected coating material by removing undesirable materials such as but not limited to mill scale, rust, dirt, grease, or other materials tending to impede adhesion to the rod. In accordance with one embodiment of the process, surface preparation stage 30 uses shot peening. Alternatively or in addition, surface preparation stage 30 may involve de-scaling, wire brushing, or other suitable known surface preparation methods. Depending upon the properties of the rod material and the selected adhesive and coating materials, and also depending upon the physical condition of the rod as supplied, effective coating of the rod may be accomplished in alternative embodiments of the process without requiring extensive (or any) surface preparation.

After passing through surface preparation stage 30, the uncoated continuous rod 15A proceeds to adhesive application stage 40 where a suitable known adhesive or bonding agent is applied to the rod surface. The specific adhesive material applied in adhesive application stage 40 will depend on the physical properties and surface condition of continuous rod 15A, as well as the properties of the selected coating material.

Next, the adhesive-treated continuous rod 15A passes through extrusion apparatus 50, which receives melted HDPE (or other selected coating material) from a suitable melter (not shown), which may be part of extrusion apparatus 50 or separate from it. Extrusion apparatus 50 incorporates an extrusion die (not shown) configured to result in the application of a preferably substantially uniform circumferential coating of coating material over continuous rod 15A as it passes through the extrusion die in conjunction with a concurrent flow of melted coating material through the die. Typically and desirably, the radial thickness of the coating will be in the range of ⅛ to ⅜ of an inch, but the coating thickness could be outside this range to suit particular requirements.

The now-coated continuous rod (indicated by reference number 15B in FIG. 2 to distinguish it from uncoated rod 15A) proceeds from extrusion apparatus 50 to cooling stage 60, where the temperature of the still-warm extruded coating is reduced as appropriate to solidify the coating. Cooling stage 60 may use any suitable known means or process for performing this function, such as (by way of non-limiting example) passing coated rod 15B through a water bath, water curtain, or air curtain.

After exiting cooling stage 60, coated continuous rod 15B passes through puller stage 70, which grips coated rod 15B and applies tractive force to pull it through the various stages of coating apparatus 10, without damaging the coating material. The finished coated continuous rod 15B is then wound onto a take-up reel 26. As will be understood by persons skilled in the art, coating apparatus 10 typically will also incorporate suitable idlers and guides (schematically represented by reference numbers 22 and 24 in FIG. 2) to facilitate the movement of the continuous rod through the various process stages. However, processes in accordance with the present disclosure are not limited to the use of any particular mechanism for moving the rod through the process stages.

Figure 3:
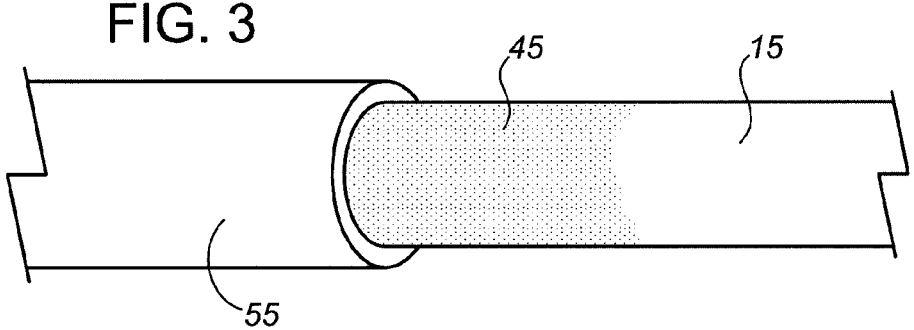
FIG. 3 is an isometric view of a continuous steel rod partially coated with a low-friction material in accordance with a process as illustrated in FIG. 2.

FIG. 3 schematically illustrates a continuous rod 15 being coated with a friction-resistant material 55 in accordance with the process described above. An adhesive (bonding agent) 45 is applied to rod 15 in advance of the application of coating 55 to enhance bonding of coating 55 onto rod 15. Adhesive 45 may be selected from a variety of known materials, including but not limited to epoxy materials such as 3M™ Scotch-Weld™ Super 77™ and 3M™ Scotch-Weld™ 90. In pull tests conducted by the present applicants, these particular adhesives were used to bond an HDPE coating extruded onto a length of rod. In a first test, a coated section of the rod was engaged by grippers, and an axial force of approximately 13,500 pounds was applied to the rod before the grippers pulled the HDPE away from the rod. In a second test, the grippers applied more pressure to the HDPE coating, and an axial force of approximately 28,000 pounds was applied to the rod without apparent damage to the HDPE coating or debonding from the steel rod. These tests illustrated the effectiveness and reliability of the resultant bond between the HDPE and the steel rod notwithstanding the inducement of significant strain in the rod under axial loading.

Friction-resistant coatings can also be extruded onto non-continuous rods in accordance with unillustrated alternative embodiments of the process and apparatus shown in FIG. 2. In accordance with one variant of such alternative processes, individual non-continuous, threaded-end rods are passed through the various stages of the apparatus generally as described with reference to FIG. 2, but with the coating being applied only to the main or middle sections of the rods (i.e., the main length of the rod between the upset ends). After the coating has been extruded onto the middle sections of the rods, an epoxy coating or other protective coating material may be applied to the upset ends of the rods to protect against abrasion, corrosion, or other damage. Alternatively, a protective powder coating may be baked onto the upset ends in accordance with well-known processes, prior to extrusion of the coating onto middle sections of the rods. Preferably, the baked-on coating will extend an inch or two along the main sections of the rods, such that the friction-resistant coating will overlap the powder coating during the extrusion stage.

Figure 4A:
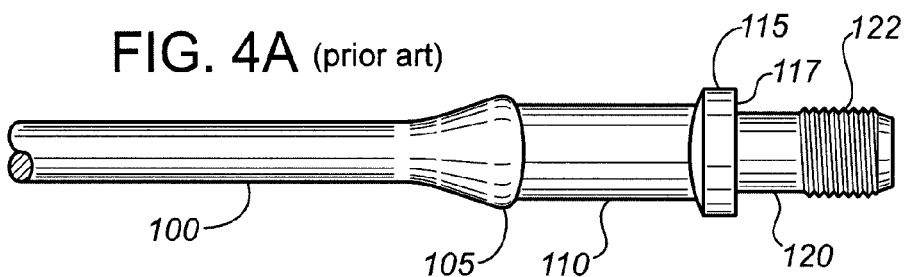
FIG. 4A illustrates the upset end of a typical prior art non-continuous sucker rod.
Figure 4B:
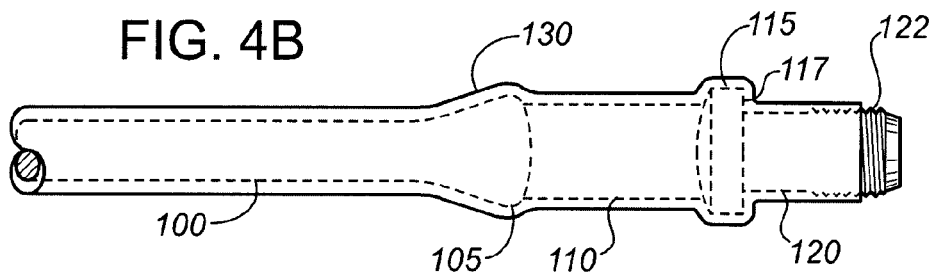
FIG. 4B illustrates the upset end of a sucker rod as in FIG. 4A after the application of a low-friction material using one variant of a process in accordance with the present disclosure.
Figure 4C:
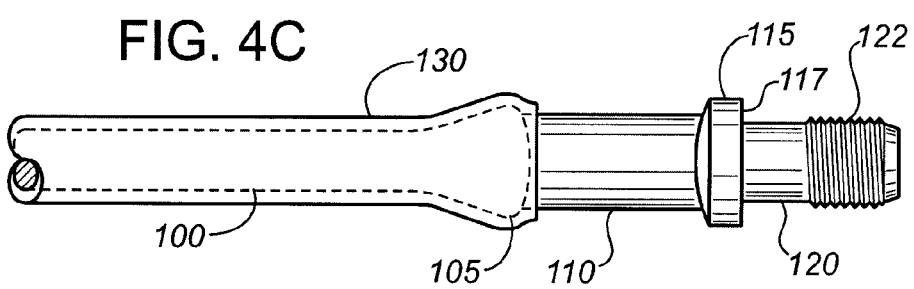
FIG. 4C illustrates the upset end of a sucker rod as in FIG. 4B after trimming of excess low-friction coating material.

In another variant of the process, the friction-resistant coating is extruded onto substantially the fully length of the threaded-end rods, and the excess coating material is removed later. This alternative process may be best understood with reference to FIGS. 4A, 4B, and 4C. FIG. 4A shows the upset end of a typical prior art sucker rod having a main middle section 100 which transitions, in sequence, with an inner upset shoulder 105, a tool-engagement section 110, an outer upset shoulder 115 defining an annular abutment face 117 (for engagement with the end of a tubular coupler, not shown), and an end section 120 having male threading 122 for engagement with a coupler. FIG. 4B depicts the end of a sucker rod as in FIG. 4A after it has passed through an extrusion apparatus in accordance with the present teachings and has received an extruded friction-resistant coating 130 along substantially its full length. FIG. 4C shows the coated rod as in FIG. 4B after coating 130 has been trimmed back to inner upset shoulder 105, thus exposing tool-engagement section 110 for access by a wrench or other tightening tool, and exposing threads 122 to allow engagement with a tubular coupler. In accordance with this alternative process, individual rods can be coated without need for special care to prevent application of the coating to tool-engagement section 110 and/or threads 122. In furtherance of this objective, adhesive application preferably will not progress beyond inner upset shoulder 105. Even more preferably, a bond-inhibiting agent may be applied to at least portions of the sections of the rod outward of inner upset shoulder 105, for greater assurance against bonding of any friction-resistance coating to those outer rod sections, and to facilitate subsequent trimming of excess coating material therefrom.

Depending on specific requirements, it may be necessary or desirable to expand or dilate the extrusion die to allow the upset rod ends to pass through. In preferred embodiments, however, the extrusion die will be of suitable size and configuration to permit passage of the upset rod ends.

It will be readily appreciated by persons skilled in the art that various modifications of embodiments in accordance with the present disclosure may be devised without departing from the scope and teaching of the present disclosure, including modifications which may use equivalent structures or materials hereafter conceived or developed. It is to be especially understood that the disclosure is not intended to be limited to any described or illustrated embodiment, and that the substitution of a variant of a claimed element or feature, without any substantial resultant change in operation or functionality, will not constitute a departure from the intended scope of the claim. It is also to be appreciated that the different teachings of the embodiments described and discussed herein may be employed separately or in any suitable combination to produce desired results.

In this patent document, any form of the word "comprise" is to be understood in its non-limiting sense to mean that any item following such word is included, but items not specifically mentioned are not excluded. A reference to an element by the indefinite article "a" does not exclude the possibility that more than one of the element is present, unless the context clearly requires that there be one and only one such element. Any use of any form of the word "typical" is to be understood in the non-limiting sense of "common" or "usual", and not as suggesting essentiality or invariability. Any use of any form of the terms "connect", "engage", "couple", "attach", or any other term describing an interaction between elements is not meant to limit the interaction to direct interaction between the subject elements, and may also include indirect interaction between the elements through secondary or intermediary structure.

What is claimed is:

1. A process for applying a coating of a low-friction material to an elongate metal rod, said process comprising:
    preparing surfaces of the rod intended to receive the coating material by removing undesirable materials therefrom, using selected surface preparation means;
    treating the prepared rod surfaces with a selected adhesive, wherein the metal rod is a steel rod having an upset threaded end, and wherein the adhesive treatment is not carried out with respect to the upset threaded end;
    passing the adhesive-treated rod through an extrusion die of selected configuration without rotating the rod, while simultaneously flowing a melted low-friction material through the die, such that a coating of the low-friction material is deposited onto the adhesive-treated surfaces of the rod; and
    using selected cooling means to solidify the coating of low-friction material.

2. A process as in claim 1 wherein the coating of low-friction material has a radial thickness between 0.125 inches and 0.375 inches.

3. A process as in claim 1 wherein the low-friction material comprises a polymeric material selected from the group consisting of high-density polyethylene, cross-linked polyethylene, polyvinylidene fluoride, ethylene tetrafluoroethylene, polytetra-fluoroethylene, polyphenylensulfide, nylon, polyester, polyethersulfone, polyethylene terephthalate, polypropylene, polystyrene, epoxy, or acetyl.

4. A process as in claim 1 wherein the selected adhesive comprises an epoxy adhesive.

5. A process as in claim 1 wherein the metal rod is a continuous steel rod.

6. A process as in claim 1 further comprising applying a protective coating material to the upset threaded end of the rod prior to passing the rod through the extrusion die.

7. A process as in claim 1 further comprising applying a protective coating material to the upset threaded end of the rod subsequent to passing the rod through the extrusion die.

8. A process as in claim 6 wherein the protective coating is selected from the group consisting of epoxy coatings and baked-on powder coatings.

9. A process as in claim 1 further comprising applying a bond-inhibiting agent to at least a portion of the upset threaded end of the rod prior to the step of passing the rod through the extrusion die.

10. A process as in claim 1 wherein the metal rod is of generally round cross-section.

11. An elongate metal rod having a coating of a low-friction material, manufactured using a process as in claim 1, wherein the metal rod is a steel rod having an upset threaded end, and wherein the upset threaded end is not treated with adhesive.

12. A process for applying a coating of a low-friction material to continuous metal sucker rod, said process comprising:
   preparing surfaces of the rod intended to receive the coating material by removing undesirable materials therefrom using selected surface preparation means;
   treating the prepared rod surfaces with a selected adhesive, the metal rod being a steel rod having an upset threaded end, and the adhesive treatment not being carried out with respect to the upset threaded end;
   passing the adhesive-treated rod through an extrusion die of selected configuration without rotating the rod while simultaneously flowing a melted low-friction material through the die, such that a coating of the low-friction material is deposited onto the adhesive-treated surfaces of the rod; and
   using selected cooling means to solidify the coating of low-friction material.

13. A process as in claim 12 wherein the coating of low-friction material has a radial thickness between 0.125 inches and 0.375 inches.

14. A process as in claim 12 wherein the low-friction material comprises a polymeric material selected from the group consisting of high-density polyethylene, cross-linked polyethylene, polyvinylidene fluoride, ethylene tetrafluoroethylene, polytetra-fluoroethylene, polyphenylensulfide, nylon, polyester, polyethersulfone, polyethylene terephthalate, polypropylene, polystyrene, epoxy, or acetyl.

15. A process as in claim 12 wherein the selected adhesive comprises an epoxy adhesive.

16. A process as in claim 12 wherein the continuous metal rod is a steel rod.

17. A process as in claim 12 further comprising applying a protective coating material to the upset threaded end of the rod, prior to the step of passing the rod through the extrusion die.

18. A process as in claim 12 further comprising applying a protective coating material to the upset threaded end of the rod subsequent to the step of passing the rod through the extrusion die.

19. A process as in claim 17 wherein the protective coating is selected from the group consisting of epoxy coatings and baked-on powder coatings.

20. A process as in claim 12 further comprising applying a bond-inhibiting agent to at least a portion of the upset threaded end of the rod prior to passing the rod through the extrusion die.

21. A process as in claim 12 wherein the metal rod is of generally round cross-section.

22. A continuous metal sucker rod having a coating of a low-friction material, manufactured using a process as in claim 12, wherein the metal rod is a steel rod having an upset threaded end, and wherein the said upset threaded end is not treated with adhesive.

* * * * *